(12) United States Patent
Biberman et al.

(10) Patent No.: US 11,449,365 B2
(45) Date of Patent: Sep. 20, 2022

(54) UBIQUITOUS AND ELASTIC WORKLOAD ORCHESTRATION ARCHITECTURE OF HYBRID APPLICATIONS/SERVICES ON HYBRID CLOUD

(71) Applicant: TRILIO DATA INC., Hopkinton, MA (US)

(72) Inventors: Aleksandr Biberman, Arlington, MA (US); Andrey Turovsky, Wynantskill, NY (US)

(73) Assignee: TRILIO DATA INC., Hopkinton, MA (US)

(*) Notice: Subject to any disclaimer, the term of this patent is extended or adjusted under 35 U.S.C. 154(b) by 0 days.

(21) Appl. No.: 15/381,427

(22) Filed: Dec. 16, 2016

(65) Prior Publication Data

US 2017/0192825 A1    Jul. 6, 2017

Related U.S. Application Data

(60) Provisional application No. 62/274,416, filed on Jan. 4, 2016.

(51) Int. Cl.
| | |
|---|---|
| *G06F 9/50* | (2006.01) |
| *H04L 67/10* | (2022.01) |
| *H04L 47/70* | (2022.01) |
| *G06N 20/00* | (2019.01) |
| *H04L 67/1012* | (2022.01) |
| *H04L 67/1008* | (2022.01) |
| *H04W 28/08* | (2009.01) |

(52) U.S. Cl.
CPC ............ *G06F 9/5072* (2013.01); *G06F 9/505* (2013.01); *G06F 9/5083* (2013.01); *H04L 67/1008* (2013.01); *H04L 67/1012* (2013.01); *H04W 28/095* (2020.05); *G06F 2209/5019* (2013.01); *G06N 20/00* (2019.01); *H04L 47/823* (2013.01)

(58) Field of Classification Search
None
See application file for complete search history.

(56) References Cited

U.S. PATENT DOCUMENTS

| | | | | |
|---|---|---|---|---|
| 7,065,588 | B2* | 6/2006 | Konda | H04L 67/2823 709/246 |
| 7,552,100 | B2* | 6/2009 | Chen | H02J 3/008 706/21 |
| 7,577,667 | B2* | 8/2009 | Hinshaw | G06F 16/273 |
| 7,603,507 | B2* | 10/2009 | Yagi | G06F 3/0614 709/239 |
| 7,607,164 | B2* | 10/2009 | Vasishth | G06F 21/577 726/1 |

(Continued)

*Primary Examiner* — Abu Zar Ghaffari
(74) *Attorney, Agent, or Firm* — Goodwin Procter LLP (57) ABSTRACT

Systems and methods for deploying computer application workload elements among a plurality of computing resources are described. An elastic workload orchestration architecture includes a workload queue that is configured to receive application workload elements for processing using one or more distributed hybrid application services. The workload elements are evaluated to confirm whether they are properly formatted for deployment among the distributed hybrid application services and, if such confirmation cannot be made, the workload elements are adapted into a proper format. An elastic workload operator then deploys the workload elements to the distributed hybrid application services.

14 Claims, 3 Drawing Sheets

(56) References Cited

U.S. PATENT DOCUMENTS

| | | | | |
|---|---|---|---|---|
| 7,616,205 B2* | 11/2009 | Matsumoto | G06T 15/08 | 345/505 |
| 8,104,038 B1* | 1/2012 | Graupner | G06F 9/5044 | 718/104 |
| 8,447,829 B1* | 5/2013 | Geller | G06F 9/468 | 709/217 |
| 8,548,790 B2* | 10/2013 | Tylutki | G06F 11/3442 | 703/13 |
| 8,843,998 B2* | 9/2014 | Fu | H04L 67/10 | 707/785 |
| 8,850,442 B2* | 9/2014 | Davis | G06F 9/5077 | 709/226 |
| 9,027,024 B2* | 5/2015 | Mick | H04L 43/0817 | 718/1 |
| 9,336,060 B2* | 5/2016 | Nori | H04L 41/0806 | |
| 9,432,485 B2* | 8/2016 | Viswanathan | H04L 67/42 | |
| 9,575,804 B2* | 2/2017 | Kochunni | G06F 9/5011 | |
| 9,678,796 B2* | 6/2017 | Mukherjee | G06F 9/5005 | |
| 9,851,933 B2* | 12/2017 | Brech | H04L 41/0893 | |
| 10,200,261 B2* | 2/2019 | Cuervo Laffaye | G06F 9/5044 | |
| 10,402,733 B1* | 9/2019 | Li | G06N 7/005 | |
| 2002/0178262 A1* | 11/2002 | Bonnell | G06F 9/5083 | 709/225 |
| 2006/0080389 A1* | 4/2006 | Powers | G06F 9/5072 | 709/203 |
| 2007/0217692 A1* | 9/2007 | Newcomer | G06K 9/00469 | 382/229 |
| 2008/0168523 A1* | 7/2008 | Ansari | G06Q 30/04 | 725/131 |
| 2008/0270461 A1* | 10/2008 | Gordon | G06F 3/0667 | |
| 2010/0257532 A1* | 10/2010 | Liang | G06F 9/5027 | 718/103 |
| 2011/0035753 A1* | 2/2011 | Palczak | G06F 11/3688 | 718/104 |
| 2011/0083157 A1* | 4/2011 | Addair | H04N 7/173 | 725/120 |
| 2011/0119381 A1* | 5/2011 | Glover | G06F 9/5072 | 709/226 |
| 2011/0125906 A1* | 5/2011 | Chunilal | G06F 17/30867 | 709/226 |
| 2012/0072985 A1* | 3/2012 | Davne | H04L 63/20 | 726/22 |
| 2012/0123898 A1* | 5/2012 | Kirkeby | G06Q 30/0631 | 705/26.7 |
| 2012/0173708 A1* | 7/2012 | Bartfai-Walcott | G06F 9/5072 | 709/224 |
| 2012/0254433 A1* | 10/2012 | Gujral | G06F 9/5072 | 709/226 |
| 2013/0114744 A1* | 5/2013 | Mutton | H04N 19/40 | 375/240.26 |
| 2013/0139152 A1* | 5/2013 | Chang | G06F 9/45558 | 718/1 |
| 2013/0152080 A1* | 6/2013 | Sachindran | G06F 9/44526 | 718/1 |
| 2013/0304903 A1* | 11/2013 | Mick | H04L 43/0817 | 709/224 |
| 2014/0032759 A1* | 1/2014 | Barton | H04L 67/10 | 709/225 |
| 2014/0047535 A1* | 2/2014 | Parla | H04L 63/20 | 726/15 |
| 2014/0108486 A1* | 4/2014 | Borzycki | G06F 21/6218 | 709/201 |
| 2014/0280488 A1* | 9/2014 | Voit | H04L 67/10 | 709/203 |
| 2014/0280964 A1* | 9/2014 | Farooq | H04L 67/10 | 709/226 |
| 2014/0351199 A1* | 11/2014 | Madani | G06N 5/048 | 706/58 |
| 2015/0046600 A1* | 2/2015 | Kim | H04L 67/1095 | 709/232 |
| 2015/0074279 A1* | 3/2015 | Maes | H04L 47/781 | 709/226 |
| 2015/0180949 A1* | 6/2015 | Maes | G06F 9/5072 | 709/201 |
| 2015/0199214 A1* | 7/2015 | Lee | G06F 9/505 | 718/102 |
| 2015/0348065 A1* | 12/2015 | Doganata | G06Q 30/0202 | 705/7.31 |
| 2015/0356000 A1* | 12/2015 | Giammaria | H04L 63/00 | 717/127 |
| 2015/0370601 A1* | 12/2015 | Ghosh | G06F 9/5077 | 718/105 |
| 2016/0070590 A1* | 3/2016 | Eicher | G06F 9/505 | 719/320 |
| 2016/0142286 A1* | 5/2016 | Kim | H04L 45/22 | 370/218 |
| 2016/0191645 A1* | 6/2016 | Hayton | H04L 67/2842 | 709/203 |
| 2016/0204923 A1* | 7/2016 | Ashok | H04L 67/10 | 709/226 |
| 2016/0205039 A1* | 7/2016 | Akolkar | G06F 9/5005 | 709/226 |
| 2016/0212501 A1* | 7/2016 | Master | H04N 21/8133 | |
| 2016/0330277 A1* | 11/2016 | Jain | H04L 67/1095 | |
| 2016/0379125 A1* | 12/2016 | Bordawekar | G06N 7/005 | 706/12 |
| 2017/0024257 A1* | 1/2017 | Cropper | G06F 9/5077 | |
| 2017/0024260 A1* | 1/2017 | Chandrasekaran | G06F 8/63 | |
| 2017/0093962 A1* | 3/2017 | Player | G06F 9/5083 | |
| 2017/0116179 A1* | 4/2017 | Gagne-Langevin | G06F 17/2725 | |
| 2017/0124340 A1* | 5/2017 | Chiu | H04L 67/10 | |
| 2017/0134301 A1* | 5/2017 | Chen | H04L 67/10 | |
| 2017/0155724 A1* | 6/2017 | Haddad | H04L 43/18 | |
| 2017/0192825 A1* | 7/2017 | Biberman | G06F 9/5072 | |

* cited by examiner

UBIQUITOUS AND ELASTIC WORKLOAD ORCHESTRATION ARCHITECTURE OF HYBRID APPLICATIONS/SERVICES ON HYBRID CLOUD

CROSS-REFERENCE TO RELATED APPLICATION

This application claims priority to and the benefit of U.S. Provisional Patent Application No. 62/274,416, filed on Jan. 4, 2016, and entitled "Ubiquitous and Elastic Workload Orchestration Architecture of Hybrid Applications/Services on Hybrid Cloud," the entirety of which is incorporated by reference herein.

TECHNICAL FIELD

The present disclosure relates generally to workload orchestration and, more particularly, to computerized systems and corresponding methods for deploying computer application workload elements among a plurality of computing resources.

BACKGROUND

Cloud computing has evolved significantly in recent years as more powerful computing resources and faster methods of communication have become widely available. However, systems for processing workloads must be specifically tailored to accommodate the various characteristics, such as granularity, of the applications or services providing the workloads. Improvements in workload orchestration architectures are needed to address this and other shortcomings in existing orchestration techniques.

BRIEF SUMMARY

Techniques for deploying computer application workload elements among a plurality of computing resources are described. In one aspect, in a computerized method, an elastic workload orchestration architecture includes a workload queue that is configured to receive application workload elements for processing using one or more distributed hybrid application services. The workload elements are evaluated to confirm whether they are properly formatted for deployment among the distributed hybrid application services and, if such confirmation cannot be made, the workload elements are adapted into a proper format. An elastic workload operator then deploys the workload elements to the distributed hybrid application services. Other aspects of the foregoing include corresponding systems and non-transitory computer-readable media.

Various implementations of these aspects can include one or more of the following features. The workload elements include applications, processes, and functions including varying profiles of granularity, size, duration, coupling, and modularity. The workload elements are received from applications and services corresponding to varying portions of an applications/services spectrum comprising macro applications at one end and micro services at an opposite end. The distributed hybrid application services include a combination of on-premises data centers, privately operated cloud computing platforms, and publicly available cloud computing platforms. Adapting a particular workload element into a proper format includes creating a container or a unikernel based on the workload element.

In one implementation, the deploying of the workload elements is based on at least one of user specifications, resource availability, workload priority, estimated execution time, execution time preference, elapsed execution time, security requirements, number of simultaneous other workloads, occurrence of specified events, redundancy specifications, and specifications for licensed software. In another implementation, the deploying of the workload elements is based on at least one of workload granularity, workload size, workload duration, workload coupling, and workload modularity. In a further implementation, the deploying of the workload elements is based on at least one of resource cost, economic factors, availability of the distributed hybrid application services, workload security constraints, workload regulation constraints, geographical and/or spatial boundaries of the distributed hybrid application services, provisioning speed of the distributed hybrid application services, latency, data locality, and other workload locality.

In yet another implementation, the deploying of the workload elements is based on a plurality of weighted factors, and the deploying includes determining, based on the weighted factors, respective preferences of a plurality of servers in the distributed hybrid application services, identifying a particular one of the servers having a highest preference, and deploying the workload elements to the server having the highest preference. A subsequent set of workload elements can also be deployed to a different server upon a change in one or more of the weighted factors.

The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
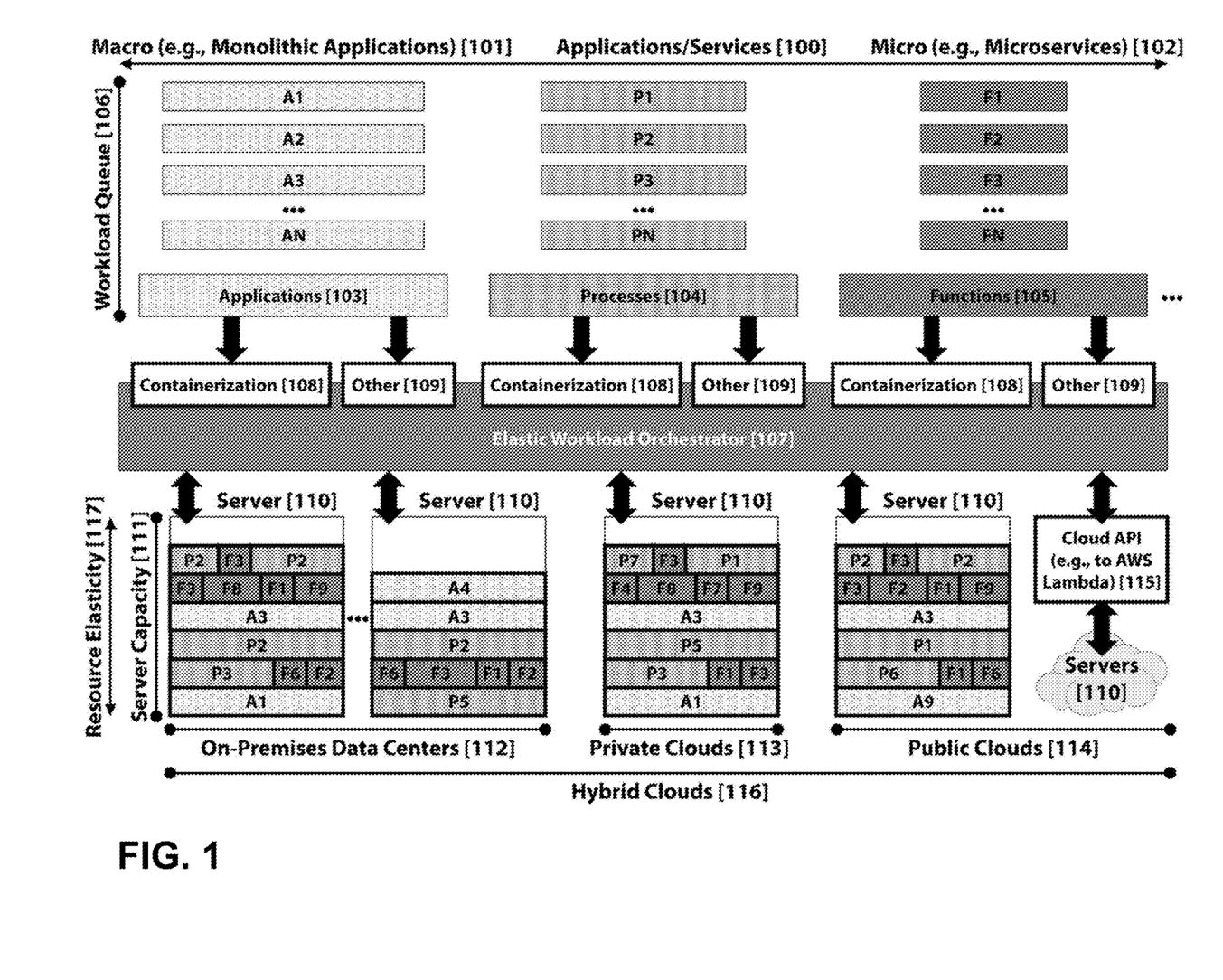
FIG. 1 depicts an example Elastic Workload Orchestration Architecture according to an implementation.

Referring to FIG. 1, an exemplary embodiment of the Elastic Workload Orchestration Architecture concept is illustrated and includes the following elements. Applications/Services [100] are software functionalities that can be reused for different purposes, and may also be coupled with policies that control their usage. For example, in an enterprise setting, Applications/Services [100] may be defined through enterprise architecture (EA) practices for organizing business processes and information technology (IT) infrastructure. Different enterprises may have different types of Applications/Services [100]. FIG. 1 shows one example spectrum of Applications/Services [100], as related to their application granularity, which is often also correlated with their size and duration. This spectrum in FIG. 1 is from Macro (e.g., Monolithic Applications) [101] types of Applications/Services [100], which exhibit coarser application granularity, [100] to Micro (e.g., Microservices) [102] types of Applications/Services [100], which exhibit finer application granularity, and beyond.

Macro (e.g., Monolithic Applications) [101] are Applications/Services [100] that exhibit coarser application granularity. On the far end of that spectrum, these may be monolithic applications, which may be single-tiered software applications in which, for example, the user interface and data access code are combined into a single program from a single platform. That far end of that spectrum may include more-self-contained applications, some without much or any modularity, that not only are responsible for a particular task, but can perform every step needed to complete a particular function. Macro (e.g., Monolithic Applications) [101] may also include Applications [103].

Applications/Services [100] that are not at the far end of the Macro (e.g., Monolithic Applications) [101] side of the spectrum typically include applications that follow service-orientation and service-oriented-architecture (SOA) design principles, and multitier (e.g., three-tier) architecture. As Applications/Services [100] get further away from that end of the spectrum, they tend to exhibit much more modularity.

Micro (e.g., Microservices) [102] are Applications/Services [100] that are on the other side of the Applications/Services [100] spectrum, as shown in FIG. 1, which exhibit finer application granularity, and typically smaller size and duration. That side of the spectrum may also include more microservices, which may support complex applications composed of many small, independent Processes [104] in communication. Microservices are typically small, fine-grained, highly decoupled, modular, and focus on performing small tasks.

Other architectures that leverage microservices, sometimes referred to as "serverless," allow events to trigger fine-grained deployment of Applications/Services [100] (e.g., Processes [104] and Functions [105]). These architectures tend to abstract the underlying resources from the Applications/Services [100] developers, and are typically more focused on the completion and duration of each event, independent of those underlying resources. In these scenarios, the developers may not be required to know or plan for how many Servers [110] they may be using.

The above paragraph describes an architecture that is in contrast to one where the developers of the Applications/Services [100] are required to have some insight into the underlying resources, and need to plan accordingly. In these scenarios, the developers tend to focus on how much resource to provision (e.g., number of Servers [110] and the hardware profile of those Servers [110]), and the corresponding behavior of the Applications/Services [100] at scale.

The present disclosure describes an Elastic Workload Orchestration Architecture with a ubiquitous orchestration capability for the full spectrum of Applications/Services [100] described above, in a hybrid manner. The Elastic Workload Orchestrator [107] is able to elastically orchestrate workload elements (or, more simply, "workloads") that are on the Macro (e.g., Monolithic Applications) [101] end of the Applications/Services [100] spectrum, the Micro (e.g., Microservices) [102] end of the Applications/Services [100] spectrum, and everything in between. This includes orchestrating workloads such as Applications [103], Processes [104], and Functions [105], which have varying profiles of granularity, size, duration, coupling, and modularity. Furthermore, the Elastic Workload Orchestrator [107] is able to deploy those workloads onto any combination of distributed hybrid application services that can process the workloads, which can include, for example, Hybrid Cloud [116] resources, spanning Servers [110] in On-Premises Data Centers [112], Private Clouds [113], and Public Clouds [114].

Applications [103], Processes [104], and Functions [105] are workloads that correspond to various Applications/Services [100], which have varying profiles of granularity, size, duration, coupling, and modularity. Applications [103] may be closer to the Macro (e.g., Monolithic Applications) [101] side of the Applications/Services [100] spectrum, and may include monolithic applications and other workloads that are less modular, as well as those that exhibit modularity. Processes [104] and Functions [105] are workloads that are finer in granularity and are more modular than Applications [103], and are closer to the Micro (e.g., Microservices) [102] side of the Applications/Services [100] spectrum. In some configurations, Processes [104] may be instances of execution that, together, make up specific workloads of the Applications/Services [100], and may be made up of multiple threads of execution. In some configurations, Functions [105] may be sets of instructions that perform specific tasks for the main workload routine, as part of the Applications/Services [100]. Functions [105] may also require direction back to the main routine of the workload. In some configurations, certain workloads (e.g., Functions [105]) may leverage application programming interfaces (APIs) that are able to leverage specific underlying resources for the workload execution, such as the Cloud API (e.g., to AWS Lambda) [115].

Workload Queue [106] is a queue of workloads, which can include Applications [103], Processes [104], and Functions [105]. These workloads correspond to various Applications/Services [100].

Elastic Workload Orchestrator [107] may refer to the Application Management Engines (106), as part of the Elastic Compute Cloud Framework described in U.S. patent application Ser. No. 14/640,569, filed on Mar. 6, 2015, and entitled "Elastic Compute Cloud Based on Underutilized Server Resources Using a Distributed Container System" (the '569 application), the entire disclosure of which is incorporated herein by reference.

Before the workloads comprising Applications [103], Processes [104], and Functions [105] are deployed onto various resources using the Elastic Workload Orchestrator [107], they may go through various adaptive or grooming steps ensure that these workloads are in the proper format for deployment, a format that can be leveraged to manage, store, transfer, and run workloads. Various technologies can be leveraged for these adaptive and grooming steps.

Containerization [108] is one such technology. Containerization [108] may leverage server virtualization methods such as operating system (OS)-level virtualization, where the kernel of an operating system (OS) allows for multiple isolated user space instances, instead of just one. Some instances of this may include, but are not limited to, containers, virtualization engines (VEs), virtual private servers (VPS), jails, or zones, and/or any hybrid combination thereof. Some example available technologies for Containerization [108] include chroot, Docker, Linux-VServer, lmctfy ("let me contain that for you"), LXC (Linux containers), Canonical LXD, OpenVZ (Open Virtuozzo), Parallels Virtuozzo Containers, Solaris Containers (and Solaris Zones), FreeBSD Jail, sysjail, WPARs (workload partitions), HP-UX Containers (SRP, secure resource partitions), iCore Virtual Accounts, Sandboxie, Spoon, and VMware ThinApp. One example proper format for deployment using Containerization [108] technology is images, which are non-changing collections of filesystem changes and corresponding execution parameters to spawn instances (called containers). For example, the workloads may be supplied as container images or links to where the container images are located, such as a container image repository. Containerization methods may also be applied to convert incoming workloads to a container image format.

Other [109] technologies may also be used in the adaptive and grooming step described above. One example of such Other [109] technology is unikernels, which consist of single address space machine images, and may be constructed with the use of library operating systems (OS). Similar to the proper Containerization [108] format described in the previous paragraph, the workloads may be supplied as unikernel images or links to where the unikernel images are located, such as a unikernel image repository. Unikernel image creation methods may also be applied to convert incoming workloads to a unikernel image format.

Server [110], which may operate within a client-server architecture, is an entity with a finite amount of Server Capacity [111] that responds to requests across a computer network to provide, or help to provide, a networked service. The client or clients may run on the same physical or virtual Server [110], or may be connected to the Server [110] over a network. Some examples of Server [110] types include computing servers, application servers, database servers, web servers, file servers, mail servers, and game servers.

Server Capacity [111] is the physical or virtual hardware compute and communication capacity of a Server [110]. Some Server Capacity [111] metrics may include, but are not limited to, capacity of its central processing unit (CPU), random-access memory (RAM), graphics processing unit (GPU), storage, network bandwidth, and memory bandwidth.

On-Premises Data Centers [112], Private Clouds [113], and Public Clouds [114] are all facilities used to house Servers [110]. These facilities are generally optimized to provide resource access, such as Servers [110], to users in a reliable infrastructure for IT operations, minimizing disruption and maximizing business continuity.

Cloud API (e.g., to AWS Lambda) [115] may allow the workloads to leverage an existing API that is connected to cloud resources that constitute an underlying infrastructure as a service (IaaS). For example, this may be accomplished by leveraging Amazon Web Services (AWS) Lambda and API Gateway. The Cloud API (e.g., to AWS Lambda) [115] is depicted in FIG. 1 as corresponding to the Public Clouds [114]. Cloud API (e.g., to AWS Lambda) [115] may also similarly be deployed across some or all components of the Hybrid Clouds [116].

Hybrid Clouds [116] are compositions of two or more infrastructures such as On-Premises Data Centers [112], Private Clouds [113], and Public Clouds [114]. In Hybrid Clouds [116], these infrastructures typically remain distinct entities that are bound together, offering the benefits of multiple deployment models.

Resource Elasticity [117] may refer to the Server [110] conditions similar to the Compute Server (100), as part of the Elastic Compute Cloud Framework described in the '569 application.

In FIG. 1, there are various workloads in the Workload Queue [106], partitioned into Applications [103], Processes [104], and Functions [105], which correspond to the various Applications/Services [100]. These workloads then can proceed through various adaptive or grooming steps to ensure that the workloads are in the proper format for deployment, which may include Containerization [108] or Other [109] steps. These adaptive or grooming steps may be part of the Elastic Workload Orchestrator [107] functionality, or may be performed using separate tools before (and/or after) the Elastic Workload Orchestrator [107]. The resulting workloads are then fed into Elastic Workload Orchestrator [107].

Figure 2:
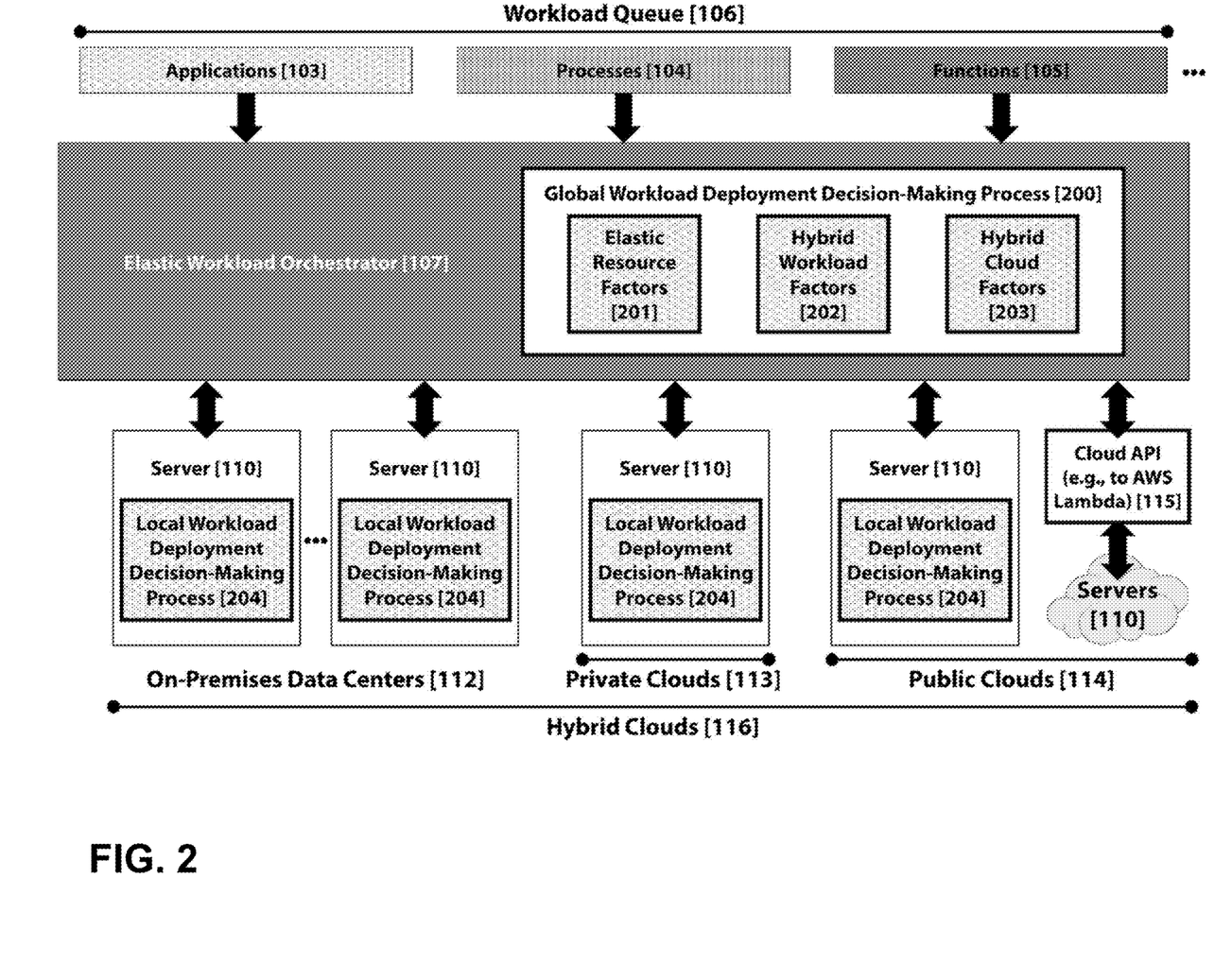
FIG. 2 depicts an example Elastic Workload Orchestration Architecture, illustrating the details of a workload deployment decision-making process according to an implementation.

Referring now to FIG. 2, the Elastic Workload Orchestrator [107] is able to make intelligent workload deployment decisions of these workloads onto the various Server [110] resources through the Global Workload Deployment Decision-Making Process [200]. The Elastic Compute Cloud Framework described in the '569 application describes that these decisions may be assisted with any combination of (a) user specifications; (b) resource (e.g., Server Capacity [111]) availability and utilization; (c) workload priority; (d) historical data, including the use of machine learning; (e) estimated execution time; (0 execution time preference; (g) elapsed execution time; (h) security boundaries in the network and/or organization; (i) number of simultaneous other workloads; (j) occurrence of specified events; (k) redundancy specifications; and (l) specifications for any licensed software. These factors are the Elastic Resource Factors [201], as part of the Global Workload Deployment Decision-Making Process [200] of the Elastic Workload Orchestrator [107].

In this invention, there are several major advantages, with added intelligence used in the Global Workload Deployment Decision-Making Process [200] of the Elastic Workload Orchestrator [107]. More specifically, the Elastic Workload Orchestrator [107]:

a) Accepts a hybrid array of workloads, which are Applications/Services [100] comprising various Applications [103], Processes [104], and Functions [105]. Some of these workloads may be long-lived monolithic applications, some may be short-lived microservices, and others may be anything in between. In such a heterogeneous workload environment, workload deployment decisions may also be assisted with any combination of (m) workload granularity; (n) workload size; (o) workload duration; (p) workload coupling; and (q) workload modularity. These factors are the Hybrid Workload Factors [202], as part of the Global Workload Deployment Decision-Making Process [200] of the Elastic Workload Orchestrator [107], as depicted in FIG. 2.

b) Deploys workloads to the Hybrid Cloud [116], which is a hybrid array of Server [110] resources that spans On-Premises Data Centers [112], Private Clouds [113], and Public Clouds [114]. Each of these resources has its own cost and economic factors to consider (e.g., the cost of bursting workloads to new cloud resources compared to deploying them in the existing On-Premises Data Center [112]), and each has its own constraints associated with physical and organizational rules and boundaries. In such a heterogeneous Hybrid Cloud [116] environment, workload deployment decisions may also be assisted with any combination of (r) resource cost and economic factors; (s) cloud Server [110] availability; (t) workload security constraints; (u) workload regulation constraints; (v) Server [110] geographical and/or spatial boundaries; (w) Server [110] provisioning speed; (x) latency; (y) data locality; (z) and other workload locality. These factors are the Hybrid Cloud Factors [203], as part of the Global Workload Deployment Decision-Making Process [200] of the Elastic Workload Orchestrator [107], as depicted in FIG. 2.

Additionally, in some instantiations, a decision-making process local to each corresponding Server [100] may accompany the deployment decisions to enable autonomous, elastic, dynamic, and in many cases real-time resource yield as soon as higher-priority workloads need the resources, and redeployment as soon as those resources become available. It can do so without requiring communication with the Elastic Workload Orchestrator [107], which also reduces the communication bandwidth between each Server [100] and the Elastic Workload Orchestrator [107]. This Local Workload Deployment Decision-Making Process [204] is depicted in FIG. 2 as local to some of the Servers [110].

The Elastic Workload Orchestrator [107] deploys workloads onto any combination of Hybrid Cloud [116] resources, spanning Servers [110] in On-Premises Data Centers [112], Private Clouds [113], and Public Clouds [114]. These may be either deployed directly, or through APIs that are able to leverage specific underlying Server [110] resources, such as the Cloud API (e.g., to AWS Lambda) [115].

Once the workloads are deployed onto the Server [110] resources, resource contention within each Server [110] is avoided by yielding and taking resources for some workloads relative to others in real time. As covered in the Elastic Compute Cloud Framework described in the '569 application, the low-latency nature of this elastic, dynamic, and real-time resource yield of Resource Elasticity [117] comes from the ability of the system to make yield and take decisions local to each Server [110] (e.g., using the Local Workload Deployment Decision-Making Process [204]), without having to communicate with the Elastic Workload Orchestrator [107], which may be a separate back-end server.

Referring still to FIG. 2, an exemplary embodiment of the Elastic Workload Orchestration Architecture concept depicting the details of the workload deployment decision-making processes is illustrated and includes the following elements.

Global Workload Deployment Decision-Making Process [200] is part of the Elastic Workload Orchestrator [107] that assists with the decision of where to deploy workloads. The Global Workload Deployment Decision-Making Process [200] may comprise any combination of Elastic Resource Factors [201], Hybrid Workload Factors [202], and Hybrid Cloud Factors [203].

Elastic Resource Factors [201] are part of the Global Workload Deployment Decision-Making Process [200], which assists with workload deployment decisions in an elastic compute environment using any combination of (a) user specifications; (b) resource (e.g., Server Capacity [111]) availability and utilization; (c) workload priority; (d) historical data, including the use of machine learning; (e) estimated execution time; (0 execution time preference; (g) elapsed execution time; (h) security boundaries in the network and/or organization; (i) number of simultaneous other workloads; (j) occurrence of specified events; (k) redundancy specifications; and (l) specifications for any licensed software. These factors are also part of the Elastic Compute Cloud Framework described in the '569 application.

Hybrid Workload Factors [202] are part of the Global Workload Deployment Decision-Making Process [200], which assists with workload deployment decisions in a heterogeneous workload environment using any combination of (m) workload granularity; (n) workload size; (o) workload duration; (p) workload coupling; and (q) workload modularity.

Hybrid Cloud Factors [203] are part of the Global Workload Deployment Decision-Making Process [200], which assists with workload deployment decisions in a Hybrid Cloud [116] environment using any combination of (r) resource cost and economic factors; (s) cloud Server [110] availability; (t) workload security constraints; (u) workload regulation constraints; (v) Server [110] geographical and/or spatial boundaries; (w) Server [110] provisioning speed; (x) latency; (y) data locality; and (z) other workload locality.

Local Workload Deployment Decision-Making Process [204], in some instantiations, is a decision-making process local to each corresponding Server [100], and may accompany the deployment decisions to enable autonomous, elastic, dynamic, and in many cases real-time resource yield as soon as higher-priority workloads need the resources, and redeployment as soon as those resources become available. It can do so without requiring communication with the Elastic Workload Orchestrator [107], which also reduces the communication bandwidth between each Server [100] and the Elastic Workload Orchestrator [107].

In FIG. 2, the various workloads in the Workload Queue [106], which may comprise any combination of Applications [103], Processes [104], and Functions [105], are fed into the Elastic Workload Orchestrator [107]. The Elastic Workload Orchestrator [107] then uses the Global Workload Deployment Decision-Making Process [200], which may comprise any combination of Elastic Resource Factors [201], Hybrid Workload Factors [202], and Hybrid Cloud Factors [203], to make an intelligent decision about on which Servers [110] to deploy the workloads.

Figure 3:
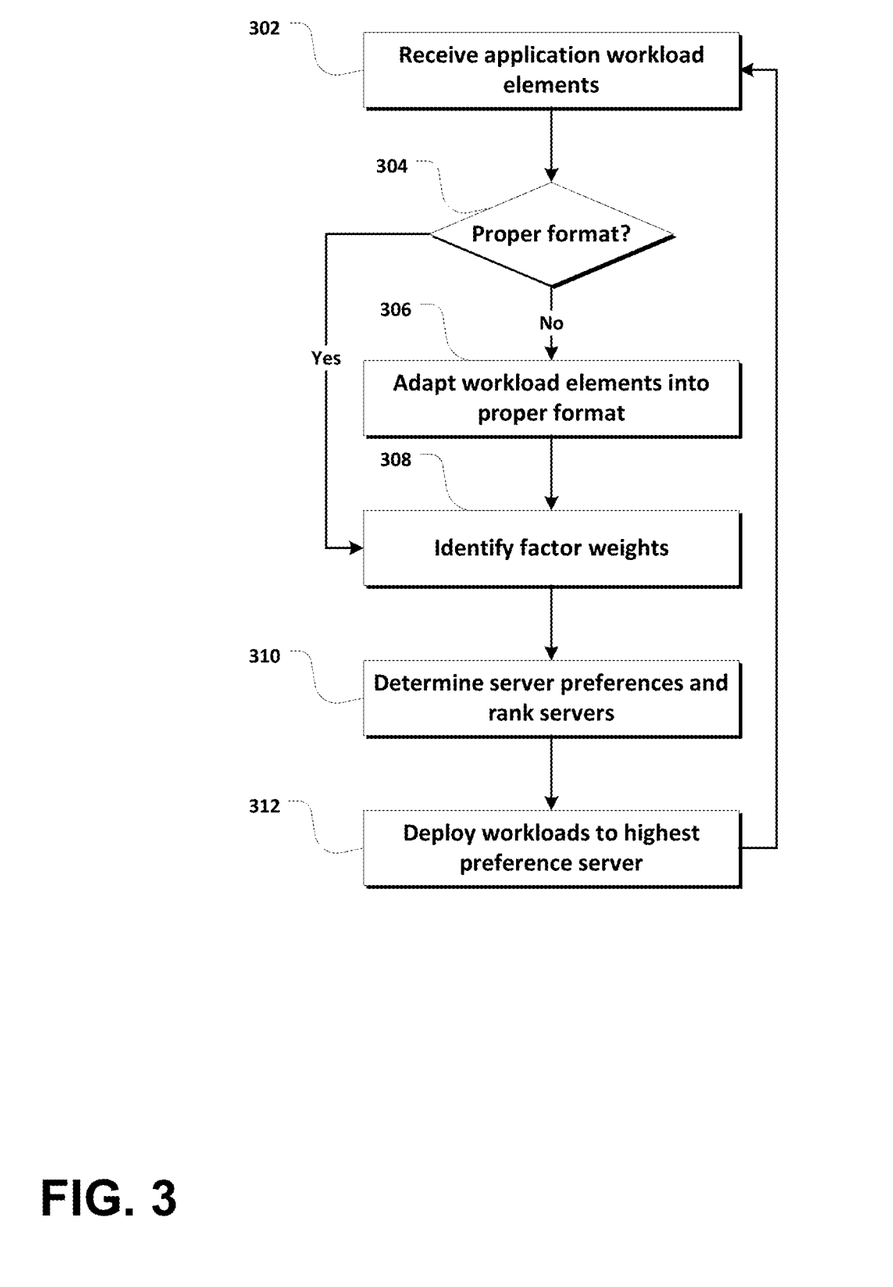
FIG. 3 depicts an example method for workload deployment according to an implementation.

FIG. 3 depicts one example of a method for workload deployment according to the presently disclosed techniques. As described in more detail above, a set of application workload elements can be received at a workload queue, examined to determine whether they are in a suitable format, and adapted to a proper format if they are not (Steps 302-306). In the present example, the Global Workload Deployment Decision-Making Process [200] can include (a) specifying (in some instances, in advance) and identifying the relative importance or weight to the various Elastic Resource Factors [201], Hybrid Workload Factors [202], and Hybrid Cloud Factors [203], for particular workloads or all workloads (Step 308); (b) applying this specified importance or weight to each available Server [110] (any suitable technique can be used to consider or combine the weights of applicable factors to determine which servers are more preferable than others for a particular workload), and ranking the available Servers [110] in order of preference (Step 310); some Servers [110] may get eliminated as candidates altogether as part of this process; (c) deploying the workloads to the Server [110] deemed as first preference (Step 312); (d) if that server gets disqualified as a candidate, for example, when the Local Workload Deployment Decision-Making Process [204] changes these factors, or if the Server [110] resource is disconnected or otherwise becomes unavailable, the next Server [110] on that list may then be used for the deployment or redeployment; (e) as any other described factors change over time, the Server [110] preference list, and the subsequent workload deployment order, may change.

In some implementations, some or all of step (a) is provided by the user ahead of time, and the rest of the steps can be accomplished automatically by the Global Workload Deployment Decision-Making Process [200], with assistance from the Local Workload Deployment Decision-Making Process [204]. For example, the user may specify that they prefer that the workload runs on Servers [110] that have already been provisioned for and are already running a particular application (Elastic Resource Factor [201]), and they prefer for the workload to run on the least expensive resource available at the time (Hybrid Cloud Factor [203]). Continuing this example, the user then provides a Micro (e.g., Microservices) [102] workload with finer application granularity and smaller size (Hybrid Workload Factor [202]). Based on these example parameters, the Server [110] preference list can automatically be generated to select those that fit that set of criteria, and the intelligent decision on which Server [110] to deploy can be made by the Global Workload Deployment Decision-Making Process [200]. If, for example, after that workload that is deployed and run on a Server [110], that server becomes unavailable or is over-utilized, the Elastic Workload Orchestrator [107] may then deploy or redeploy the workload to the next Server [110] on the preference list.

The Elastic Workload Orchestrator [107] deploys the workloads to the corresponding Servers [110], which are part of the array of Hybrid Cloud [116] resources that spans On-Premises Data Centers [112], Private Clouds [113], and Public Clouds [114]. In some configurations, certain workloads (e.g., Functions [105]) may leverage APIs that are able to leverage specific underlying resources for the workload execution, such as the Cloud API (e.g., to AWS Lambda) [115].

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in a non-transitory information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A computerized method for deploying computer application workload elements among a plurality of computing resources, the method comprising:
receiving at a workload queue a plurality of application workload elements to be processed using one or more distributed hybrid application services;
adapting the workload elements into a format configured for deployment among the distributed hybrid application services, wherein adapting a particular one of the workload elements comprises, prior to deployment of the particular workload element, converting the particular workload element into a container image format or a unikernel image format such that the particular workload element can be run on one or more of the distributed hybrid application services;
deploying, by a workload operator, the workload elements to the distributed hybrid application services, wherein the workload elements together compose a specific workload for a particular application,
wherein a first one of the workload elements is deployed to an on-premises data center in the distributed hybrid application services, wherein a second one of the workload elements is deployed to a privately operated cloud computing platform in the distributed hybrid application services, and wherein a third one of the workload elements is deployed to a publicly available cloud computing platform in the distributed hybrid application services,
wherein the deploying is based on an evaluation of a combination of weighted factors, wherein the weighted factors comprise (i) factors associated with workload deployment decisions in an elastic computing environment, (ii) factors associated with workload deployment decisions in a heterogeneous workload environment, and (iii) factors associated with workload deployment decisions in a hybrid cloud environment, wherein the deploying is further based on using a machine learning model trained on historical resource utilization data of the distributed hybrid application services to predict resource utilization of a plurality of computing resources corresponding to the on-premises data center, privately operated cloud computing platform, and publicly available cloud computing platform, and wherein the deploying comprises:
determining, based on the weighted factors and after a preference input provided by a user, respective preferences of a plurality of servers in the distributed hybrid application services, wherein the respective preferences of the plurality of servers are based on the preference input;
identifying a particular one of the servers having a highest preference;
deploying the workload elements to the server having the highest preference;
determining, by the workload operator, that the server having the highest preference is subject to disqualification from processing the workload elements, wherein a decision-making process executing locally on the server having the highest preference causes the disqualification as a result of the decision-making process changing one or more weighted factors associated with the server having the highest preference; and
based on the disqualification, identifying, by the workload operator, a particular one of the servers having a next highest preference and redeploying the workload elements to the server having the next highest preference.

2. The method of claim 1, wherein each workload element comprises either an application, a process, or a function, and wherein the workload elements comprise varying profiles of granularity, size, duration, coupling, and modularity.

3. The method of claim 1, wherein the workload elements are received from applications and services corresponding to varying portions of an applications/services spectrum comprising macro applications at one end and micro services at an opposite end.

4. The method of claim 1, wherein the distributed hybrid application services comprise a combination of on-premises data centers, privately operated cloud computing platforms, and publicly available cloud computing platforms.

5. The method of claim 1, wherein the factors associated with workload deployment decisions in an elastic computing environment comprise user specifications, resource availability, workload priority, estimated execution time, execution time preference, elapsed execution time, security requirements, number of simultaneous other workloads, occurrence of specified events, redundancy specifications, and/or specifications for licensed software.

6. The method of claim 1, wherein the factors associated with workload deployment decisions in a heterogeneous workload environment comprise workload granularity, workload duration, workload coupling, and/or workload modularity.

7. The method of claim 1, wherein the factors associated with workload deployment decisions in a hybrid cloud environment comprise resource cost, economic factors, availability of the distributed hybrid application services, workload security constraints, workload regulation constraints, geographical and/or spatial boundaries of the distributed hybrid application services, provisioning speed of the distributed hybrid application services, latency, data locality, and/or workload locality.

8. A computerized system for deploying computer application workload elements among a plurality of computing resources, the system comprising:
at least one memory for storing computer-executable instructions; and
at least one processor for executing the instructions stored on the memory, wherein execution of the instructions programs the at least one processor to perform operations comprising:
receiving at a workload queue a plurality of application workload elements to be processed using one or more distributed hybrid application services;
adapting the workload elements into a format configured for deployment among the distributed hybrid application services, wherein adapting a particular one of the workload elements comprises, prior to deployment of the particular workload element, converting the particular workload element into a container image format or a unikernel image format such that the particular workload element can be run on one or more of the distributed hybrid application services;
deploying, by a workload operator, the workload elements to the distributed hybrid application services, wherein the workload elements together compose a specific workload for a particular application,
wherein a first one of the workload elements is deployed to an on-premises data center in the distributed hybrid application services, wherein a second one of the workload elements is deployed to a privately operated cloud computing platform in the distributed hybrid application services, and wherein a third one of the workload elements is deployed to a publicly available cloud computing platform in the distributed hybrid application services,
wherein the deploying is based on an evaluation of a combination of weighted factors, wherein the weighted factors comprise (i) factors associated with workload deployment decisions in an elastic computing environment, (ii) factors associated with workload deployment decisions in a heterogeneous workload environment, and (iii) factors associated with workload deployment decisions in a hybrid cloud environment, wherein the deploying is further based on using a machine learning model trained on historical resource utilization data of the distributed hybrid application services to predict resource utilization of a plurality of computing resources corresponding to the on-premises data center, privately operated cloud computing platform, and publicly available cloud computing platform, and wherein the deploying comprises:
determining, based on the weighted factors and after a preference input provided by a user, respective preferences of a plurality of servers in the distributed hybrid application services, wherein the respective preferences of the plurality of servers are based on the preference input;
identifying a particular one of the servers having a highest preference;
deploying the workload elements to the server having the highest preference;
determining, by the workload operator, that the server having the highest preference is subject to disqualification from processing the workload elements, wherein a decision-making process executing locally on the server having the highest preference causes the disqualification as a result of the decision-making process changing one or more weighted factors associated with the server having the highest preference; and
based on the disqualification, identifying, by the workload operator, a particular one of the servers having a next highest preference and redeploying the workload elements to the server having the next highest preference.

9. The system of claim 8, wherein each workload element comprises either an application, a process, or a function, and wherein the workload elements comprise varying profiles of granularity, size, duration, coupling, and modularity.

10. The system of claim 8, wherein the workload elements are received from applications and services corresponding to varying portions of an applications/services spectrum comprising macro applications at one end and micro services at an opposite end.

11. The system of claim 8, wherein the distributed hybrid application services comprise a combination of on-premises data centers, privately operated cloud computing platforms, and publicly available cloud computing platforms.

12. The system of claim 8, wherein the factors associated with workload deployment decisions in an elastic computing environment comprise user specifications, resource availability, workload priority, estimated execution time, execution time preference, elapsed execution time, security requirements, number of simultaneous other workloads, occurrence of specified events, redundancy specifications, and/or specifications for licensed software.

13. The system of claim 8, wherein the factors associated with workload deployment decisions in a heterogeneous workload environment comprise workload granularity, workload duration, workload coupling, and/or workload modularity.

14. The system of claim 8, wherein the factors associated with workload deployment decisions in a hybrid cloud environment comprise resource cost, economic factors, availability of the distributed hybrid application services, workload security constraints, workload regulation constraints, geographical and/or spatial boundaries of the distributed hybrid application services, provisioning speed of the distributed hybrid application services, latency, data locality, and/or workload locality.

* * * * *